United States Patent
Lottes

(10) Patent No.: US 9,975,498 B2
(45) Date of Patent: May 22, 2018

(54) MOTOR VEHICLE WITH AN ELECTRONIC RECEPTACLE UNIT COMPRISING A PLURALITY OF SEPARATE RECEPTACLE SPACES CONFIGURED TO RECEIVE A PLURALITY OF FUNCTION MODULES OF A PORTABLE COMMUNICATIONS DEVICE

(71) Applicant: Audi AG, Ingolstadt (DE)

(72) Inventor: Daniel Lottes, Kelheim (DE)

(73) Assignee: Audi AG, Ingolstadt (DE)

( * ) Notice: Subject to any disclaimer, the term of this patent is extended or adjusted under 35 U.S.C. 154(b) by 0 days. days.

(21) Appl. No.: 15/541,608

(22) PCT Filed: Jan. 11, 2016

(86) PCT No.: PCT/EP2016/000032
§ 371 (c)(1),
(2) Date: Jul. 5, 2017

(87) PCT Pub. No.: WO2016/113125
PCT Pub. Date: Jul. 21, 2016

(65) Prior Publication Data
US 2018/0001834 A1 Jan. 4, 2018

(30) Foreign Application Priority Data

Jan. 13, 2015 (DE) .................. 10 2015 000 398

(51) Int. Cl.
*H01R 11/30* (2006.01)
*H01R 13/60* (2006.01)
(Continued)

(52) U.S. Cl.
CPC .......... *B60R 11/0241* (2013.01); *H01R 11/30* (2013.01); *H01R 13/6205* (2013.01); *H01R 27/00* (2013.01); *H01R 2201/26* (2013.01)

(58) Field of Classification Search
CPC .... H01R 11/30; H01R 13/60; H01R 13/6205; H01R 27/00; B60R 11/0241
(Continued)

(56) References Cited

U.S. PATENT DOCUMENTS 5,217,187 A * 6/1993 Criswell ................ B64G 1/002
244/171.3
5,331,136 A * 7/1994 Koenck .................. B60R 11/02
235/375
(Continued)

FOREIGN PATENT DOCUMENTS

DE   101 20 465 A1   11/2002
DE   101 47 300 A1   4/2003
(Continued)

OTHER PUBLICATIONS

International Search Report and Written Opinion directed to related International Patent Application No. PCT/EP2016/000032, dated Apr. 22, 2016, with attached English-language translation; 23 pages.
(Continued)

*Primary Examiner* — Chandrika Prasad
(74) *Attorney, Agent, or Firm* — Sterne, Kessler, Goldstein & Fox, PLLC

(57) ABSTRACT

The invention relates to a motor vehicle with on-board electronics and an in-vehicle electronic receptacle unit for a portable communications device that is electrically connected to the on-board electronics, wherein the receptacle unit has at least one separate receptacle space that is designed to individually receive a function module in a state separated from the communications device, whereby the function module is reversibly separable from the communications device and can be reattached, and being designed for
(Continued)

electrically coupling the separate function module to the on-board electronics to perform the intended function of the function module.

13 Claims, 3 Drawing Sheets

(51) Int. Cl.
*B60R 11/02* (2006.01)
*H01R 13/62* (2006.01)
*H01R 27/00* (2006.01)

(58) Field of Classification Search
USPC ............................................. 439/38, 39, 40
See application file for complete search history.

(56) References Cited

U.S. PATENT DOCUMENTS

| | | | | |
|---|---|---|---|---|
| 5,530,619 | A * | 6/1996 | Koenck | B60R 11/02 235/462.46 |
| 5,895,906 | A * | 4/1999 | Danielson | G06F 1/1632 235/462.45 |
| 6,244,512 | B1 * | 6/2001 | Koenck | B60R 11/02 235/462.45 |
| 6,431,451 | B1 * | 8/2002 | Koenck | B60R 11/02 235/462.45 |
| 6,608,399 | B2 * | 8/2003 | McConnell | B60R 11/02 307/10.1 |
| 8,634,873 | B2 * | 1/2014 | Jones | H04M 1/0235 455/41.2 |
| 9,658,651 | B2 * | 5/2017 | Balogh | G06F 1/1656 |
| 2002/0140289 | A1 * | 10/2002 | McConnell | B60R 11/02 307/10.1 |
| 2009/0163241 | A1 * | 6/2009 | Vossoughi | H04M 1/0254 455/556.1 |
| 2010/0005396 | A1 * | 1/2010 | Nason | G06F 3/1438 715/746 |
| 2010/0197148 | A1 * | 8/2010 | Rudisill | H01R 11/30 439/40 |
| 2011/0230178 | A1 | 9/2011 | Jones et al. | |
| 2014/0004902 | A1 | 1/2014 | Chang | |
| 2014/0194169 | A1 | 7/2014 | Singhal | |

FOREIGN PATENT DOCUMENTS

| | | |
|---|---|---|
| DE | 10 2004 035 871 A1 | 2/2006 |
| DE | 10 2007 041 257 A1 | 3/2009 |
| DE | 10 2009 025 433 A1 | 1/2010 |
| DE | 10 2009 032 622 A1 | 1/2011 |
| DE | 10 2012 014 855 A1 | 1/2014 |
| EP | 2 103 476 A2 | 9/2009 |

OTHER PUBLICATIONS

International Preliminary Report on Patentability directed to related International Patent Application No. PCT/EP2016/000032, dated Mar. 22, 2017; 13 pages.
English-language abstract of German Patent Application Publication No. 101 20 465 A1; 2 pages.
English-language abstract of German Patent Application Publication No. 101 47 300 A1; 1 page.
English-language abstract of German Patent Application Publication No. 10 2004 035 871 A1; 1 page.
English-language abstract of German Patent Application Publication No. 10 2007 041 257 A1; 1 page.
English-language abstract of German Patent Application Publication No. 10 2009 025 433 A1; 1 page.
English-language abstract of German Patent Application Publication No. 10 2009 032 622 A1; 2 pages.
English-language abstract of German Patent Application Publication No. 10 2012 014 855 A1; 1 page.
English-language abstract of European Patent Application Publication No. 2 103 476 A2; 1 page.

* cited by examiner

MOTOR VEHICLE WITH AN ELECTRONIC RECEPTACLE UNIT COMPRISING A PLURALITY OF SEPARATE RECEPTACLE SPACES CONFIGURED TO RECEIVE A PLURALITY OF FUNCTION MODULES OF A PORTABLE COMMUNICATIONS DEVICE

TECHNICAL FIELD

The invention relates to a motor vehicle with on-board electronics and an in-vehicle electronic receptacle unit for a portable communications device that is electrically connected to the on-board electronics. In addition, the invention relates to a method for providing information in a motor vehicle with on-board electronics, the motor vehicle including an in-vehicle electronic receptacle unit for a portable communications device that is electrically connected to the on-board electronics.

BACKGROUND

Motor vehicles with on-board electronics and an in-vehicle electronic receptacle unit for a portable communications device that is electrically connected to the on-board electronics are known from the prior art. For example, DE 10 2012 014 855 A1 describes a motor vehicle that has a holding device on which an electronic mobile input and output unit can be affixed in a detachable manner. A smartphone is particularly preferable as the input and output unit.

BRIEF DESCRIPTION OF THE DRAWINGS/FIGURES

DETAILED DESCRIPTION

Figure 1:
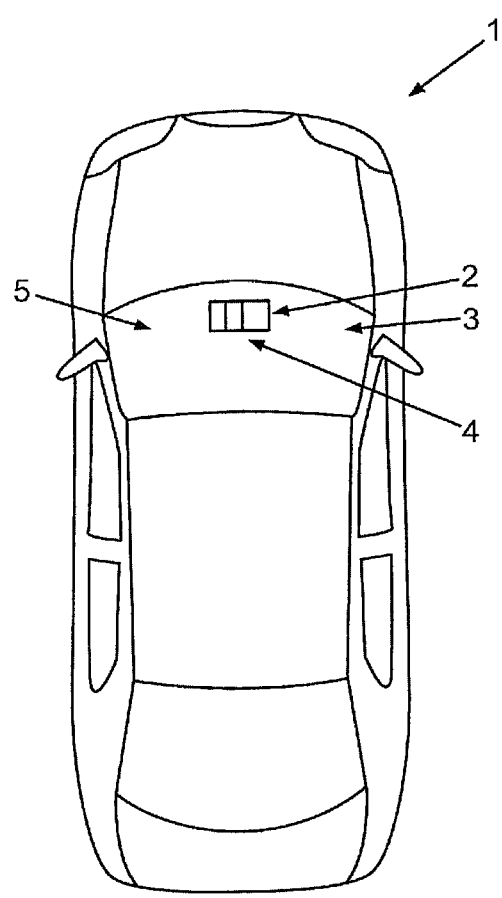
FIG. 1 shows a schematic top view of an exemplary embodiment of a motor vehicle according to the invention having a receptacle unit for a portable communications device.

The object of the invention is to provide a motor vehicle with an in-vehicle electronic receptacle unit for a portable communications device, with which the communications device can be held in a large number of ways and with many variants. It is also the object of the invention to provide a method for using such a receptacle unit to provide information in the motor vehicle.

This object is achieved according to the invention by a motor vehicle as well as by a method having the features according to the respective independent claims.

A motor vehicle according to the invention that has on-board electronics, and an in-vehicle electronic receptacle unit that is electrically connected to the on-board electronics is used to hold a portable communications device. A fundamental idea behind the invention is that the receptacle unit has at least one separate receptacle space that is designed to individually receive a function module in a state separated from the communications device that is reversibly separable from the communications device and can be reattached. In particular, the function module is only a separate substantively designed subunit of the communications device, which can, in particular, be handled independently of at least a second subunit and can be reversibly detached from and attached to the communications device. The receptacle space is designed for electrically coupling the separate function module to the on-board electronics to perform the intended function, in particular only of the function module.

The receptacle unit with the at least one receptacle space makes it possible to receive parts of the communications device in the form of the function modules individually and with many variants.

In particular, it is thus provided that the communications device is modular in design, includes different function modules, and can as a result be configured individually. For example, the communications device can be designed as a mobile phone, in particular as a smartphone. The function module can, for example, be designed as a screen, in particular as a touch-sensitive screen, and/or a camera and/or a memory module and/or a keyboard and/or a battery and/or a speaker and/or a radio interface. Preferably, the communications device has an endoskeleton to which the individual function modules can be attached. The function modules are, therefore, in each case, separate substantive units that can be attached to or removed from the communications device and, in another combination with other function modules, can be reversibly reassembled in a non-destructive manner into an alternative embodiment of a communications device. The function modules are, therefore, designed in a conscious and defined manner as components that can be detached and reattached in a non-destructive manner and provide their intended, original function in various module combinations.

It is provided that the function modules can be separated from the communications device and received independently of each other by the at least one separate receptacle space of the receptacle unit to be electronically connected to the on-board electronics of the motor vehicle. In particular, it is provided that the function module received in the at least one receptacle space can perform its intended function. This means, for example, that a battery of the communications device can be charged and/or used for the energy supply of the motor vehicle. Furthermore, a display of the communications device can be used, for example, to visually display vehicle information to the user of the motor vehicle and/or a touch-sensitive display or a touch-sensitive screen of the communications device can be used, for example, to provide an operating capability of the motor vehicle to the user of the motor vehicle and make it possible for the user to input information. As an alternative or in addition to this, a radio interface of the communications device, for example, a Bluetooth module and/or a Wi-Fi module and/or an NFC module (Near-Field Communication), can, for example, be arranged in at least one separate receptacle space to provide such a communications interface or radio interface for the motor vehicle. The motor vehicle can thus be upgraded by the receptacle unit having the at least one separate receptacle space with regard to certain functions that are provided by the function modules of the communications device. For example, the motor vehicle can easily be kept up to date with the latest technical standards. In addition, a function of the function module can be used both in the motor vehicle and on the communications device. Thus, the separate receptacle space, which is in particular universal, can provide the possibility to use existing hardware components in the form of the function modules for the motor vehicle.

It is preferably provided that the function module can be separated from and attached to the communications device and/or receptacle unit during operation or a "hot-swapping mode". This means that the manner of operation of other function modules does not lead to a functional interruption of the other function modules as a result of separating or attaching the function module to the communications device and/or the receptacle unit. This can be ensured, for example, if the communications device, for example, if an endoskeleton of the communications device, and/or in the receptacle unit, includes a processor and/or an energy storage unit.

In particular, it is provided that the receptacle unit has a plurality of separate receptacle spaces and is designed to receive a plurality of different separated function modules of the communications device in the receptacle spaces. Thus, for example, the communications device can be disassembled into all respective function modules, which provide full functionality of the communications device, and the function modules can be received by the separate receptacle spaces. Each of the function modules can thus be operated in the respective receptacle space with its intended function. The separate receptacle spaces can, for example, be designed in different sizes and/or with contacting options arranged in various ways. For example, the function modules can be in various sizes, preferably in accordance with a modular construction principle. The sizes of the function modules are preferably provided in such a way that several function modules can be mounted onto an endoskeleton of the communications device and the end of a function module attached to the endoskeleton on the edge side is flush with the endoskeleton or a support plate of the communications device.

It is preferably provided that the function module is designed as a reversibly separable screen and/or as a reversibly separable keyboard and/or as a reversibly separable camera. However, the function module can also be designed, for example, as a memory module and/or as an energy storage unit, for example as a battery, and/or as a speaker and/or as a blood pressure monitor and/or as a thermal imaging camera. A size of the function module is preferably predetermined by the surface occupied by the function module on the endoskeleton or the support plate, while a depth or thickness of the function modules can be diverse. For example, the reversibly separable camera can be replaced with a camera that has a larger lens. The advantage is, therefore, that the function modules can be designed in a large number of ways and with many variants to allow the user of the function modules to have an individual focus on certain functionalities. For example, a user may place value on a large screen. The large screen can then be separated from the communications device and received by the receptacle space in the motor vehicle, where the intended function is provided.

In a further embodiment, it can be provided that several receptacle spaces of the receptacle unit are arranged at different and at spaced locations in an interior of the motor vehicle. The receptacle spaces in the motor vehicle are preferably arranged in such a way that the intended use of the function module in the receptacle space is maximized. For example, the receptacle space for a camera can be provided as the function module, for example, on an interior rear-view mirror of the motor vehicle and/or on a headliner of the motor vehicle such that the camera is suitably arranged for monitoring the vehicle interior and/or vehicle occupants. Thus, the camera or the camera module can, for example, also provide an image that is used to identify a vehicle's occupants and perform authentication of the vehicle occupants. The authentication can be used, for example, to personalize the motor vehicle. Thus, for example, an adjustment of the motor vehicle that is personal and individually stored can be performed automatically.

In a further embodiment, it can be provided that the function module can be operated with a man-machine interface of the motor vehicle. Thus, the operation of the function module can be carried out using the man-machine interface of the motor vehicle, for example, using a voice command and/or by pressing a button of a control element of the vehicle itself. Thus, the camera as the function module can, for example, be triggered by pressing a button of a multifunctional steering wheel of the motor vehicle. It is, therefore, advantageous that the function modules can be operated with the existing human-machine interface of the motor vehicle.

In particular, it is provided that the function modules are designed as modules of a communications device that is of modular design with regard to the function modules and designed as a mobile terminal device. Preferably, the function modules can be used separately from and externally to the mobile terminal device for the intended function. The mobile terminal device is, for example, designed as a smartphone and the modules can provide the full functional capability of a smartphone in a complementary combination. Modular also means, however, that the functionality of a module can be provided independently of another module. For example, the camera of the communications device can be provided fully functionally without a communications module of the communications device. The function modules, which are designed as modules, make it possible to design the mobile terminal device in a large number of ways, individually and with many variants with personal focuses.

Furthermore, it is preferably provided that the receptacle space includes at least one magnet (for example, magnet 14 of FIG. 3.) that can be used to reversibly attach the function module to the receptacle space. The magnet can be used to reliably and precisely attach the function module to the receptacle space. Furthermore, the magnet allows the function module to be separated or removed from the receptacle space in many cases without substantial occurrence of wear at the receptacle space that could have a function-impairing effect on the function module. The function module can be separated in a non-destructive manner.

In a further embodiment, it can be provided that the receptacle unit includes a cover that is designed to cover the receptacle unit towards the interior of the motor vehicle in a visually protected manner. The cover is thus oriented in such a way that a user of the motor vehicle looks at the cover when seated a normal position and the receptacle unit arranged behind the cover is essentially concealed from the user. The cover can, for example, be adjusted to only partially conceal the receptacle unit or not conceal it at all. The cover allows the function module and/or the receptacle unit to be protected against soiling, for example, with dust. In addition, for example, a center console having the receptacle unit concealed by the cover has a neater appearance and the safety of the vehicle can be increased.

In a further embodiment, it can be provided that the receptacle unit is designed as an endoskeleton and includes an evaluation unit that is designed for use of the attached function module. For example, the receptacle unit can include the endoskeleton, which corresponds to an endoskeleton of the communications device. Thus, the attachment of the function modules can be designed effectively. Furthermore, the receptacle unit can include an evaluation unit to thereby provide an interface for the use of the attached function module. Thus, for example, firmware can be provided for the respective function module to enable the motor vehicle access to the function module and vice versa. However, the evaluation unit can also be arranged separately from the receptacle unit in the motor vehicle and/or can be included by at least parts of a further evaluation unit of the motor vehicle.

In a method according to the invention, information is provided in a motor vehicle with on-board electronics. The motor vehicle includes an in-vehicle electronic receptacle unit for a portable communications device that is electrically connected to the on-board electronics. An essential idea of the invention is that a function module of a communications device is separated from the communications device in a non-destructive manner and arranged at a separate receptacle space of the receptacle unit, and the function module is electrically coupled to the on-board electronics when it is received in the receptacle space to perform the intended function of the function module.

The method thus makes it possible to reversibly separate the function module of the communications device, in particular a mobile terminal device, and individually and reversibly arrange it in the motor vehicle by means of the receptacle space. By arranging the function module in the receptacle space, the function module is electrically connected to the on-board electronics of the motor vehicle. Thus, the functionality of the function module is made available to the motor vehicle and the functionality of the motor vehicle is made available to the function module. The function module is thus, for example, connected to a bus system, for example a Controller Area Network (CAN) bus and/or a FlexRay bus, of the motor vehicle.

Additional features of the invention result from the claims, figures and the description of the figures. The features and feature combinations mentioned above in the description, as well as the features and feature combinations mentioned below in the description of the figures and/or shown in the figures alone can not only be used in the respectively specified combinations, but also in other combinations or separately, without departing from the scope of the invention. Thus, embodiments of the invention that are not explicitly shown and explained in the figures, but are contained in the described embodiments and producible by means of separated feature combinations are to be regarded as included and disclosed. Embodiments and feature combinations are also to be considered as being disclosed, which thus do not have all the features of an originally formulated independent claim.

Embodiments of the invention are described in the following with reference to the drawing.

Figure 2:
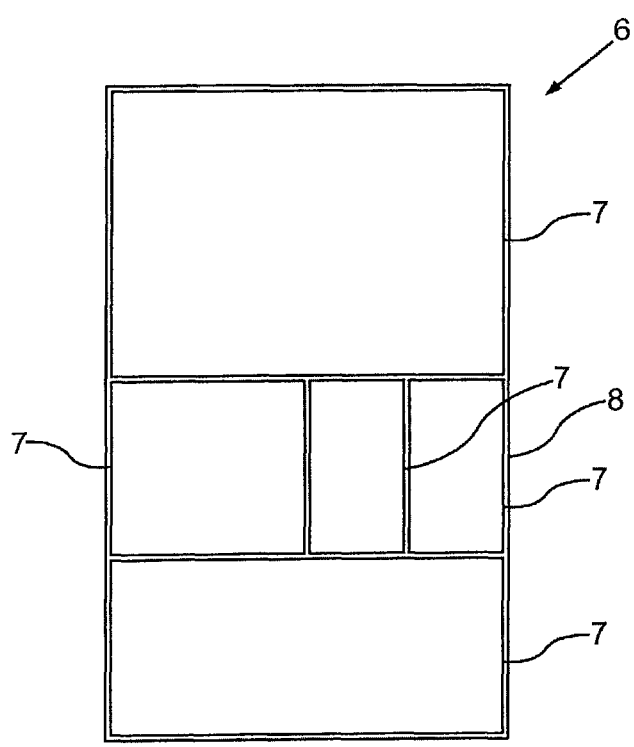
FIG. 2 shows a schematic depiction of the portable communications device having various separable function modules.
Figure 3:
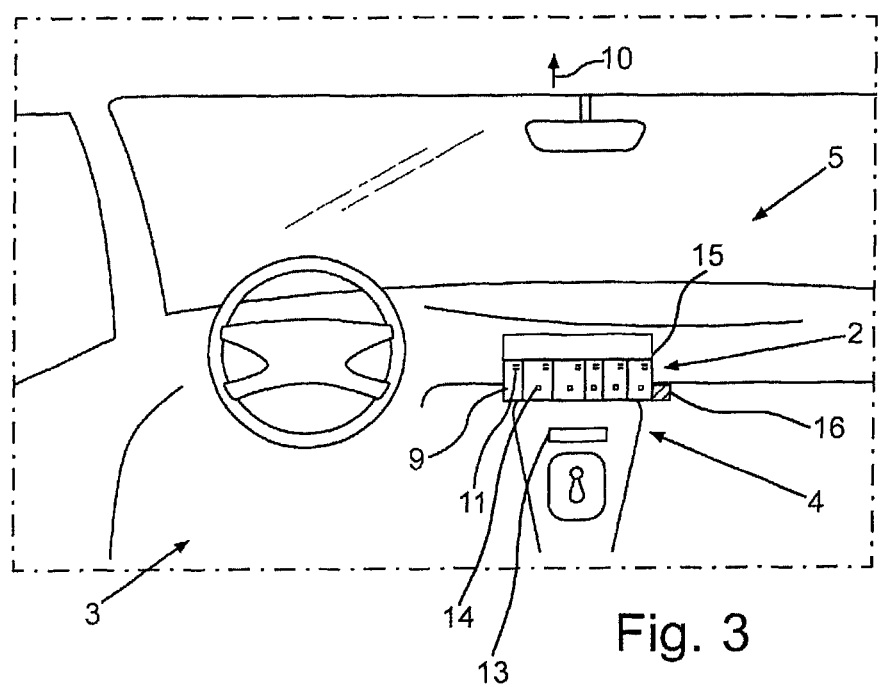
FIG. 3 shows a schematic depiction of a cockpit of the motor vehicle with the receptacle unit.

The following is shown:

FIG. 1 a schematic top view of an exemplary embodiment of a motor vehicle according to the invention having a receptacle unit for a portable communications device;

FIG. 2 a schematic depiction of the portable communications device having various separable function modules; and FIG. 3 a schematic depiction of a cockpit of the motor vehicle with the receptacle unit.

FIG. 1 shows a schematic top view of a motor vehicle 1 having an in-vehicle electronic receptacle unit 2 according to an embodiment of the invention. Receptacle unit 2 is arranged in an interior 3 of motor vehicle 1 according to the exemplary embodiment. For example, the receptacle unit 2 can be arranged at a center console 4 of a cockpit 5 of the motor vehicle 1. The receptacle unit 2 is electronically connected to the on-board electronics of the motor vehicle 1. However, the receptacle unit 2 can be arranged in a large number of ways in the interior 3 of the motor vehicle 1. However, this is preferably done in such a way that a functionality of a function module arranged in the receptacle unit 2 can be used for the intended function.

FIG. 2 shows a communications device 6 that has separable and reattachable function modules 7. Thus, the function modules 7 are attached to an endoskeleton 8 of the communications device according to the exemplary embodiment. The endoskeleton 8 can, for example, be designed as a support plate with magnets for attaching the function modules 7. The function module 7 can, for example, be designed as a screen and/or a keyboard and/or a camera and/or a memory module and/or a communications module. In combination, the function modules 7 full functionality of the communications device 6 can be provided. For example, a camera can be used effectively, in particular in conjunction with a storage device.

In particular, the function modules 7 can be arranged in a large number of ways on the endoskeleton 8—preferably in such a way that an edge of the endoskeleton 8 is flush with an edge of the respective function module 7. A size of the function module 7 can, for example, be predetermined by grid-like uniform spacing units of the endoskeleton 8. The endoskeleton 8 can thus, for example, have a predetermined number of length units and width units. The various function modules 7 then require a certain number of length units and width units. A larger screen can thus, for example, be attached to the endoskeleton 8 if a smaller camera is used for this purpose. Swapping the function modules 7 is also possible in a variety of ways; however, it is preferably done in such a way that the total number of the function modules 7 intended for use can preferably be arranged on the endoskeleton 8 of the communications device 6 without gaps, i.e. directly adjacent. A depth of the function modules 7 can preferably be freely selected. The camera as the function module 7 can thus, for example, be replaced by a different camera having a deeper lens.

The function modules 7 can, therefore, only be separated from endoskeleton 8 and attached to the motor vehicle 1 using the receptacle unit 2.

FIG. 3 shows the receptacle unit 2 in the interior 3. The receptacle unit is arranged in the area of the center console 4 according to the exemplary embodiment. However, the arrangement of the receptacle unit 2 is possible in a variety of ways; however, it is preferably done in such a way that the intended function of the function module 7 can be carried out.

According to the exemplary embodiment, the receptacle unit 2 and the receptacle spaces 9 are adjacent and arranged in a row perpendicular to a vehicle vertical axis 10 of the motor vehicle 1. Each of the separate receptacle spaces 9 is designed in a state separated from the communications device 6 to individually receive one of the function modules 7 that are reversibly separable from the communications device 6 and can be reattached. By receiving the function module 7, the receptacle space 9 makes it possible to, in particular, electrically couple the function module 7 to the on-board electronics 13 of the motor vehicle 1. Preferably, the intended function of the function module 7 can be carried out after the coupling.

Thus, the function module 7 can, for example, be designed as a battery and/or as a display or a screen and/or a keyboard and/or a memory module and/or a camera and/or a communications module. The battery can, for example, be charged by means of the on-board electronics 13 after it is received by the receptacle space 9. The screen can be used, for example, to display, in particular visually, information of the motor vehicle 1 to the user of the motor vehicle 1. In addition or alternatively, the user of the motor vehicle 1 can also make an input controlling the motor vehicle 1 via a touch-sensitive screen. The controlling input can also be made, for example, via the keyboard received in the receptacle space 9. Furthermore, the interior 3 can be monitored, for example, with the camera received in the receptacle space 9. The camera arranged in the receptacle space 9 can also be used, for example, to authenticate people in the interior 3 of the motor vehicle 1. For example, it is possible to check whether the person in the interior 3 is authorized to operate the motor vehicle 1. In addition or alternatively, the camera in the receptacle space 9 can also be used to personalize settings of the motor vehicle 1. For example, an image from the camera in the receptacle space 9 can be used, in particular by means of an evaluation unit 16 of the motor vehicle 1, to determine which individual user of the motor vehicle 1 is currently located at which position in the motor vehicle 1. A setting of a seat of the motor vehicle 1 and/or a driver assistance system and/or a volume of an audio output can, for example, be individually adjusted based on the identified user. The settings of the motor vehicle 1 can, for example, be kept in a database of the motor vehicle 1 for the purpose of individual adjustment.

In accordance with the method, the receptacle unit 2 can be applied as follows. The user of the motor vehicle 1 enters the motor vehicle 1 with his/her communications device 6. The communications device 6 is, as already described in FIG. 2, in particular a mobile terminal device of modular design. The user of the communications device 6 can then separate individual function modules 7. The separated function module 7 can then be attached to the receptacle space 9 by the user. By attaching the function module 7 to the receptacle space 9, the function module 7 is electrically connected to the on-board electronics of the motor vehicle 1. The intended function of the function module 7 is then available to the user. It is then possible, in particular, to use the function module 7 to access the motor vehicle 1 and/or to use the motor vehicle 1 to access the function module 7. On the one hand, it is thus possible for the motor vehicle 1 to support the function module 7. For instance, the battery as the function module 7 can be charged. On the other hand, the functionality of the motor vehicle 1 can be extended by the function module 7. For example, the motor vehicle 1 can be equipped or upgraded with the camera and/or the memory module and/or the screen and/or the communications module or radio module.

The function module 7 is reversibly attached to the receptacle space 9 and can thus be separated or removed from the receptacle space 9 at any time, for example also during operation of the motor vehicle 1. The user can then, for example, arrange the function module 7 on the communications device 6 again. The separation of the function module 7 from the receptacle space 9 and thus from the motor vehicle 1 also allows the function module 7 to be taken out of the motor vehicle 1 when the motor vehicle 1 is exited. Thus, for example, increased theft protection of the function module 7 can be provided.

Furthermore, the user of the motor vehicle 1 has the possibility to upgrade or retrofit the motor vehicle 1 in a large number of ways with the function modules 7. Thus, for example, a larger screen as the function module 7 can be arranged on the receptacle space 9 that, for example, replaces a smaller screen. For example, the memory as the function module 7 can also provide more storage space, for example, for a music database of the motor vehicle 1.

The size of the receptacle space 9 can vary. Thus, for example, a larger receptacle space 9 can be provided for the screen as the function module 7 than for the memory as the function module 7. There are also numerous options for the arrangement of the receptacle spaces 9. For example, the receptacle spaces 9 can be arranged at different places in the interior 3 of the motor vehicle 1. These places are preferably arranged in the interior 3 of the motor vehicle 1 in such a way that the intended function of the function module 7 can be carried out effectively. It is thus preferably provided that the camera as the function module 7 can detect a face of the user or an occupant of the motor vehicle 1. In other words, the receptacle unit 2 can be present in a distributed manner because of the presence of the receptacle spaces 9 at various places throughout the interior 3.

The function module 7 is preferably attached to the receptacle space 9 with a magnetic holder. The magnetic holder allows the function module 7 to be separated from the receptacle space 9 in a non-destructive manner.

The receptacle space 9 includes contacting elements 11. The contacting elements 11 make it possible to ensure an electrical connection of the function module 7 to the on-board electronics of the motor vehicle 1. The contacting elements 11 and/or the size of the receptacle space 9 is preferably adjusted according to a size and/or a position of contacting elements of the communications device 6.

In an exemplary embodiment that is not shown in further detail, the receptacle unit 2, and thus the respective receptacle space 9, is, where appropriate, concealed by a cover 15 of the receptacle unit 2.

The invention claimed is:

1. A motor vehicle comprising:
   on-board electronics; and
   an in-vehicle electronic receptacle unit, for a portable communications device, that is electrically connected to the on-board electronics, wherein:
   the portable communications device comprises a plurality of function modules,
   the in-vehicle electronic receptacle unit comprises a plurality of separate receptacle spaces, each of the plurality of separate receptacle spaces configured to receive one of the plurality of function modules in a state separate from the portable communications device,
   the plurality of function modules are reversibly separable from the portable communications device and are configured to be reattached,
   the in-vehicle electronic receptacle unit is configured to electrically couple at least one of the plurality of function modules to the on-board electronics to perform an intended function of the at least one of the plurality of function modules, and
   the plurality of function modules are each separate substantive units that are configured to be attached to or removed from the portable communications device and, in another combination, are configured to be reversibly reassembled in a non-destructive manner into an alternative arrangement of the portable communications device.

2. The motor vehicle of claim 1, wherein the plurality of separate receptacle spaces of the in-vehicle electronic receptacle unit are arranged at different, spaced locations in an interior of the motor vehicle.

3. The motor vehicle of claim 1, wherein the at least one of the plurality of function modules is configured to be operated with a human-machine interface of the motor vehicle such that the motor vehicle is upgraded by the in-vehicle electronic receptacle unit having the plurality of separate receptacle spaces with regard to the intended function provided by the at least one of the plurality of function modules.

4. The motor vehicle of claim 1, wherein the portable communications device further comprises a mobile terminal device and has a modular design.

5. The motor vehicle of claim 1, wherein each of the plurality of separate receptacle spaces comprises at least one magnet configured to reversibly attach one of the plurality of function modules to the respective one of the plurality of separate receptacle spaces.

6. The motor vehicle of claim 1, wherein the in-vehicle electronic receptacle unit comprises a cover configured to cover the in-vehicle electronic receptacle unit towards an interior of the motor vehicle in a visually protected manner.

7. The motor vehicle of claim 1, wherein the in-vehicle electronic receptacle unit is designed as an endoskeleton and comprises an evaluation unit configured to be used by the plurality of function modules.

8. A method for providing information in a motor vehicle with on-board electronics, the motor vehicle comprising an in-vehicle electronic receptacle unit, for a portable communications device, that is electrically connected to the on-board electronics, the method comprising:
receiving, at a separate receptacle space of the in-vehicle electronic receptacle unit, a function module of the portable communications device, wherein the function module is separated from the portable communications device in a non-destructive manner and is arranged at the separate receptacle space of the in-vehicle electronic receptacle unit; and
electrically coupling the function module to the on-board electronics when the function module is received in the separate receptacle space to perform an intended function of the function module,
wherein the in-vehicle electronic receptacle unit comprises a plurality of separate receptacle spaces and is configured to receive a plurality of separated function modules of the portable communications device in the plurality of separate receptacle spaces, and
wherein the plurality of separated function modules are each separate substantive units that are configured be attached to or removed from the portable communications device and, in another combination, are configured to be reversibly reassembled in a non-destructive manner into an alternative arrangement of the portable communications device.

9. The method of claim 8, wherein the plurality of separate receptacle spaces of the in-vehicle electronic receptacle unit are arranged at different, spaced locations in an interior of the motor vehicle.

10. The method of claim 8, wherein the portable communications device comprises a mobile terminal device and has a modular design.

11. The method of claim 8, wherein each of the plurality of separate receptacle spaces comprises at least one magnet configured to reversibly attach one of the plurality of separated function modules to the respective one of the plurality of separate receptacle spaces.

12. The method of claim 8, wherein the in-vehicle electronic receptacle unit comprises a cover configured to cover the in-vehicle electronic receptacle unit towards an interior of the motor vehicle in a visually protected manner.

13. The method of claim 8, wherein the in-vehicle electronic receptacle unit is designed as an endoskeleton and comprises an evaluation unit configured to be used by the plurality of function modules.

* * * * *